Nov. 4, 1952          J. J. SLOMER          2,616,991
TROLLEY POLE
Filed April 28, 1949
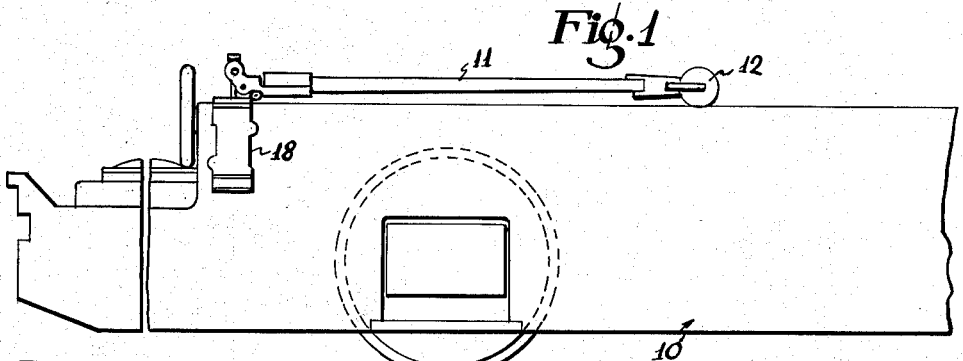
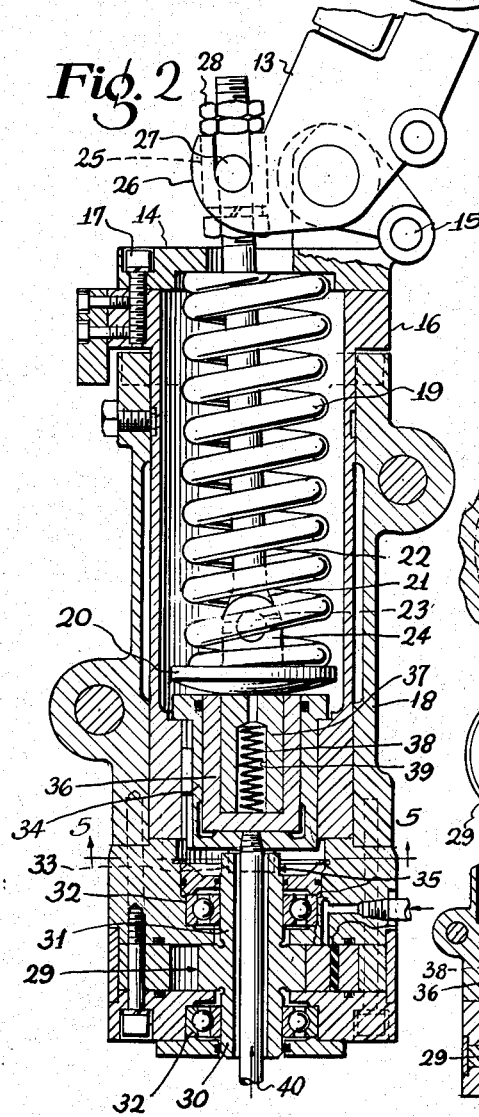
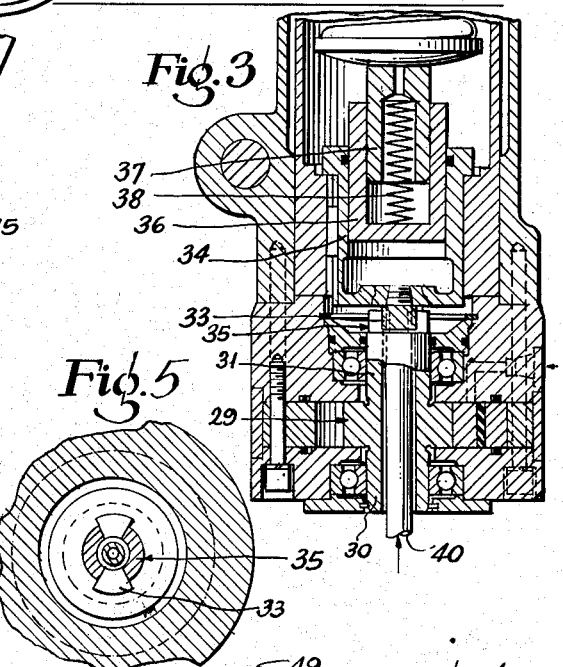
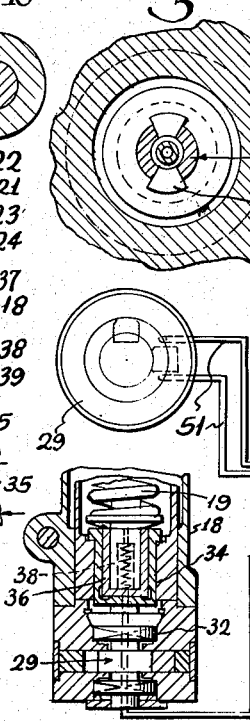
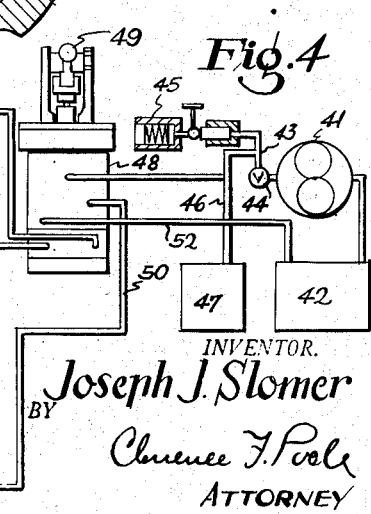
INVENTOR.
Joseph J. Slomer
BY Clarence F. Poole
ATTORNEY Patented Nov. 4, 1952

2,616,991

UNITED STATES PATENT OFFICE 2,616,991

TROLLEY POLE

Joseph J. Slomer, Chicago, Ill., assignor to Goodman Manufacturing Company, Chicago, Ill., a corporation of Illinois Application April 28, 1949, Serial No. 90,095

3 Claims. (Cl. 191—70)

This invention relates to improvements in trolley poles, and has as its principal object to provide an improved form of self-retrieving trolley pole particularly adapted for use on mine locomotives operating underground.

This application is a continuation in part of my application Serial No. 726,645, filed February 5, 1947, and entitled Improvements in Trolley Poles, which application has become abandoned.

Heretofore fluid operated self-retrieving trolley poles have been used where it is desirous to instantaneously lower the trolley pole so as to prevent breakage of the trolley pole by engagement with the mine roof when the trolley wheel or current collector jumps its trolley wire. Such a self-retrieving trolley pole is shown in my Patent No. 2,437,213. One disadvantage in such self-retrieving trolley poles, however, occurs when the current collector or trolley wheel is in engagement with the trolley wire and the pole is in a relatively low position. The retrieving piston will then be extended from its cylinder and fluid within the cylinder will retard upward movement of the trolley pole. Where the trolley wire rises steeply with respect to the locomotive, the fluid in the cylinder will retard instantaneous upward movement of the pole to such an extent that the trolley wheel will not follow the trolley wire and will consequently jump the wire.

In carrying out my invention I remedy these disadvantages by providing a pilot piston adapted to move with respect to the retrieving piston and by interposing a spring between these two pistons which will move the retrieving piston in a direction to expel fluid from its cylinder when fluid under pressure is relieved from behind the retrieving piston. Thus any restraint exerted by the retrieving piston to upward movement of the trolley pole is relieved and the trolley wheel may readily follow a trolley wire of varying heights without jumping the wire.

These and other objects of my invention will appear from time to time as the following specification proceeds and with reference to the accompanying drawings wherein:

Figure 1 is a fragmentary view in side elevation of the control end of a mine locomotive;

Figure 2 is an enlarged view in longitudinal section taken through the trolley pole supporting means and showing the various parts thereof in normal operating position;

Figure 3 is a fragmentary longitudinal sectional view drawn to substantially the same scale as Figure 2, but showing the trolley pole retrieving piston in a different position than in Figure 2;

Figure 4 is a diagrammatic view showing the diagram of the fluid system for supplying fluid under pressure to the trolley pole retrieving cylinder and piston; and Figure 5 is a fragmentary sectional view taken along line 5—5 of Figure 2, showing the connecting means for slewing the trolley pole by means of an hydraulic rotor.

In the drawings, the invention is herein shown as preferably applied to a mine locomotive 10 having a trolley pole 11 with a current collector or trolley wheel 12 on its outer end for supplying electric power to the locomotive motors (not shown). Said locomotive may be of any well known electric type and is only shown herein to illustrate a preferred manner in which my invention may be utilized.

The trolley pole 11 is mounted in a trolley pole support 13 which may be transversely pivoted to a trolley pole base 14 on a transverse pivot pin 15 (see Figure 2). The base 14 is herein shown as being an annular plate and may be suitably secured to the upper end of a cylindrical support member 16, as by cap screws 17, 17. Said cylindrical support member extends within and is rotatably mounted in a socket member 18 which may be secured to a side plate of the locomotive 10.

A heavy compression spring 19 is mounted within the cylindrical supporting member 16 and abuts the underside of the base 14 at its upper end. The opposite end of the spring 19 engages the upper side of a circular-shaped abutment member 20, which is transversely pivoted to an eye 21 on the lower end of an eyebolt 22 by means of a pivotal pin 23. Said pin extends through the eye of the eyebolt and through ears 24 which project upwardly from the abutment member 20 along opposite sides of said eye. The eyebolt extends upwardly through the spring 19 and a block 25 which is trunnioned to an arm 26 of the trolley pole support 13 by means of a trunnion pin 27. Lock nuts 28, 28 are threaded on the upper end of the eyebolt 22 and abut the upper side of block 25 to hold said block on the eyebolt and to adjust the tension of the spring 19. The compressive spring 19 thus serves to move the trolley pole to an upright position through the eyebolt 22.

An hydraulically actuated rotor 29 is provided to rotatably turn the trolley pole in the socket 18. As shown herein said rotor is substantially the same as disclosed in my Patent No. 2,437,213, so will not be more fully described herein, with the exception of certain improvements which are set forth below. The rotor shown in the drawings herein has an extended lower cylindrical hub 30 and a similar upper hub 31, both of which are individually journaled in separate anti-friction radial thrust bearings 32, which may be of the ball bearing type, as shown in Figure 2. This construction avoids binding of the rotor and insures a free rotary movement during slewing operation of the trolley pole by said rotor. As herein shown, the rotor may be operatively connected to a lower depending portion 33 of a retrieving cylinder 34 by means of a positive jaw-type clutching arrangement indicated generally at 35. The cylinder 34 in turn is keyed to the inside of the lower end of the cylindrical support member 16 to provide connective means for turning said support member and the trolley pole upon the admission of fluid under pressure to the rotor 29.

Referring now to certain other novel features of my invention, a retrieving piston 36 is slidably mounted within the cylinder 34. Said piston is of a hollowed cylindrical formation with a closed bottom and an open top, and has a pilot piston 37 slidably mounted therein and adapted to engage the bottom of the abutment member 20. A small spring 38 mounted in a hollowed out center portion 39 of the pilot piston engages the inside surface of the closed bottom of said retrieving piston 36, and serves to extend the pilot piston 37 from the retrieving piston 36 whereby the top of piston 37 engages the bottom surface of the abutment member 20. Said spring 38 also serves to move the retrieving piston downwardly within the cylinder 34, thereby causing the retrieving piston 36 to expel fluid from the retrieving cylinder 34 when fluid pressure is relieved therefrom, as when the trolley pole is raised. A pressure passageway 40, extending through the lower depending portion 33 of the retrieving cylinder 34 and through the central axis of the rotor 29, connects the fluid supply to the retrieving cylinder 34. Pressurized fluid admitted to the bottom of the retrieving cylinder 34 will force the piston 36 to move upwardly along the walls of said cylinder to compress the spring 19 and thereby allow the trolley pole 11 to drop to a horizontal position (see Figure 1).

The fluid pressure system for supplying fluid under pressure to the rotor 29 and to the cylinder 34 includes a fluid pump 41 connected to a fluid storage tank 42 for pumping fluid from said tank to supply fluid under pressure to the fluid system. Pressurized fluid leaves the pump through a pressure line 43 having a check valve 44 therealong. Said pressure line may be connected with a pressure responsive switch 45 of any well known form, connected with a motor (not shown) for driving the pump 41. This pressure switch 45 is used for controlling operation of said motor, and for stopping the pump when pressure in the line 43 exceeds a predetermined value. A pressure line 46 connects the pressure line 43 with an accumulator 47 provided for accumulating fluid under pressure to be supplied to the fluid system when the pump 41 is not in operation, as for instance, when the trolley wheel 12 is disconnected from the trolley wire. The pressure line 46 is also connected with a valve 48 which is provided to control the supply of fluid under pressure to the cylinder 34 and to independently control the supply of pressurized fluid to the rotor 29, by which the trolley pole is swiveled in the desired direction so the trolley wheel 12 may be readily replaced on the trolley wire by the locomotive operator without his leaving the control cab. Said valve is of a combination sleeve and rotary type operated from a single control handle 49, and is clearly shown and described in my Patent No. 2,437,213, so need not herein be shown or described in detail. A pressure line 50 connects said valve to the pressure passageway 40 to supply fluid under pressure to the cylinder 34 for lowering the trolley pole. Pressure lines 51, 51 connect said valve 48 with the rotor 29 for selectively supplying fluid under pressure to opposite sides of said rotor to turn the trolley pole about the vertical axis of the rotor in either direction. A return line 52 connects the valve 48 with the fluid storage tank 42 to return fluid thereto. Thus when the valve 48 is moved to a position to supply fluid under pressure to the cylinder 34 through the line 50, by operation of the control handle 49, fluid under pressure will be admitted to the cylinder 34 via pressure passageway 40, moving the piston 36 upwardly along said cylinder to compress the spring 19 and permit the trolley pole to drop of its own weight to a horizontal position along the upper deck of the locomotive. To raise the trolley pole from the position shown in Figure 1, fluid under pressure is relieved from the cylinder 34 by movement of the valve 48 to a relief position; the spring 19 will then force the trolley pole upwardly so the wheel 12 may be placed on the trolley wire (see Figure 2). When the wire is low and close to the deck of the locomotive, the trolley pole will be pushed downwardly to a lowered position close to the deck of the locomotive by the trolley wire, with the spring 19 in a compressed state. With the trolley pole in this position, the abutment member 20 will not be moved downwardly within the cylindrical support member 16 far enough to move the retrieving piston 36 downwardly within the cylinder 34 a distance sufficient to exhaust all the fluid from the retrieving cylinder 34. The pilot piston 37, however, while engaging the abutment member on its lower face, will tend to move the retrieving piston downwardly within the cylinder 34 by means of the spring 38, to exhaust fluid from said cylinder. The fluid thus being expelled from the cylinder 34 by means of the pilot valve and spring 38, the abutment member and eyebolt 22 will be free to move downwardly when compression is relieved from the spring 19 upon the trolley pole moving rapidly upward to follow a steeply rising trolley wire.

The pilot piston 37 and spring 38, by moving the piston 36 within the cylinder 34, will thus expel fluid from said cylinder and relieve the spring 19 from any resistance that might tend to prevent it from moving the trolley pole upwardly fast enough to hold the trolley wheel in engagement with a steeply upwardly inclined trolley wire, so as to insure against the trolley wheel jumping the trolley wire where the height of the trolley wire varies rapidly with respect to the locomotive.

While I have herein shown and described one form in which my invention may be embodied, it should be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a trolley pole adapted to follow a trolley wire of varying heights, a trolley pole support member, a pole transversely pivoted on said support member and having a current collector on its outer end, a rod operatively connected with said pole and extending within said support member, a spring encircling said rod and having operative connection therewith for urging said pole into an upright position to hold said current collector in engagement with a trolley wire, a fluid cylinder mounted in said support member, a fluid operated retrieving piston movable within said cylinder and adapted to move into engagement with said rod, for positively moving said rod and to move said trolley pole to a lowered position, a pilot piston mounted within and movable with respect to said retrieving piston and having engagement with said rod, and spring means interposed between said pilot piston and said retrieving piston for moving said retrieving piston in a direction away from said rod, to expel fluid from said cylinder in advance of the downward movement of said rod and provide for upward movement of said trolley pole when pressure is relieved from said cylinder, whereby said current collector will readily follow a trolley wire of varying heights opposed in said movement only by the load of said spring means.

2. In a trolley pole adapted to follow a trolley wire of varying heights, a trolley pole support member, a pole transversely pivoted on said support member and having a current collector on its outer end, a rod operatively connected with said pole and extending within said support member, a spring encircling said rod and having operative connection therewith for urging said pole into a working position with said current collector in engagement with a trolley wire, a fluid cylinder mounted in said support member, a fluid operated retrieving piston movable within said cylinder and at times having operative connection with said rod, valve means for admitting fluid under pressure to said cylinder, to move said piston along said cylinder to positively move said rod against said spring to move said trolley pole to a lowered position, the operative connection from said piston to said rod including a pilot piston slidably mounted within said retrieving piston and movable with respect thereto, and spring means interposed between said pilot piston and said retrieving piston for moving said retrieving piston in a direction away from said rod when said valve is turned to relieve fluid pressure from said cylinder for expelling fluid from said cylinder and for preventing fluid in said cylinder from retarding upward movement of said trolley pole in following a trolley wire of varying heights, so that the movement of said trolley pole is opposed only by the load of said spring means.

3. In a trolley pole adapted to follow a trolley wire of varying heights, a socket, a cylindrical support mounted within said socket for pivotal movement with respect thereto about the axis of said support member, a plate closing the upper end of said support member, a pole transversely pivoted on said plate and having a current collector on its outer end adapted to engage a trolley wire, a spring extending within said support member and engaging said plate at one of its ends, a rod encircled by said spring and operatively connected with said pole at one of its ends and engaged by said spring at its opposite end, whereby said spring yieldably urges said pole into an upright position, a fluid cylinder mounted adjacent the lower end of said support member, a retrieving piston movable therein, a pilot piston slidably mounted within said retrieving piston and movable with respect to said retrieving piston and having an operative connection with said rod for lowering said pole upon the admission of fluid under pressure to said cylinder, and a spring interposed between said retrieving piston and said pilot piston, to maintain said pilot piston in operative engagement with said rod, said last-named spring cooperating with said pilot piston to move said retrieving piston in a direction to exhaust fluid from said cylinder when pressure is relieved therefrom, whereby said trolley pole and said collector will follow a trolley wire of varying heights, and be opposed in such movement by the load in said last named spring.

JOSEPH J. SLOMER.

REFERENCES CITED

The following references are of record in the file of this patent:

UNITED STATES PATENTS

| Number | Name | Date |
|---|---|---|
| 558,870 | Wellman | Apr. 21, 1896 |
| 2,437,213 | Slomer | Mar. 2, 1948 |